3,375,245
**METHOD OF MAKING SODIUM CARBOXY-
METHYL CELLULOSE**
Robert J. Dearborn, Muncie, Ind., assignor to Warner
Machine Products, Inc., Muncie, Ind., a corporation of
Indiana
No Drawing. Filed Apr. 5, 1962, Ser. No. 185,218
1 Claim. (Cl. 260—231)

ABSTRACT OF THE DISCLOSURE

A method of making sodium carboxymethyl cellulose from regenerated cellulose in which comminuted regenerated cellulose is mixed with aqueous solutions of chloracetic acid and sodium hydroxide to form a reaction mixture. The water concentration of the reaction mixture is adjusted and said mixture is allowed to react until the ratio of the carboxymethyl groups substituted into the glucose molecules is in the range of from 0.45 to 0.85 to 1.

---

This invention relates to a method of producing sodium carboxymethyl cellulose, and more particularly to a method of producing sodium carboxymethyl cellulose using regenerated cellulose as a starting material.

Sodium carboxymethyl cellulose has much commercial utility and is used in many fields, such as for example, as an additive in drilling muds, as a thickener and dispensing agent in the manufacture of cosmetics and paints, as an additive in the food industry, as a soil-suspending agent in soaps and detergents, etc. In view of such commercial utility, there has been much work done in methods of making sodium carboxymethyl cellulose, and many such methods have been patented.

Although many of the patented methods for producing sodium carboxymethyl cellulose use the basic reaction of treating a cellulosic material with caustic soda followed by treatment with an etherifying material such as monochloracetic acid, they use different cellulosic materials as starting materials which may be subjected to different pretreatments. For example, the method disclosed in Patent No. 2,131,733 uses cellulose in sheet form as a starting material. In the method of Patent No. 2,278,612 a continuous sheet of cotton linters is used as a starting material, and in Patent No. 2,067,946 granulated and fluffed cellulose are used as starting materials.

It is therefore an object of my invention to provide a method of making sodium carboxymethyl cellulose from inexpensive regenerated cellulose, which will produce a high grade of said sodium carboxymethyl cellulose from said regenerated cellulose, which will produce sodium carboxymethyl cellulose having a high bulk density, and which may employ said regenerated cellulose in either its wet or dry state.

My method of making sodium carboxymethyl cellulose from regenerated cellulose produces improved results over the methods heretofore employed using wood pulp and cotton linters in that such regenerated cellulose, particularly scrap cellophane, is available at a lower cost than said wood pulp and cotton linters. Further, being non-fibrous, it is more readily and uniformly acted upon by the caustic and etherifying materials than said wood pulp and cotton linters. And by being non-fibrous, it is more conveniently handled by comminuting machinery with the production of less dust and/or fines than said wood pulp and cotton linters.

Because of its non-fibrous nature, the regenerated cellulose need not be in as fine a state of subdivision during etherification as a fibrous type cellulose, and the bulk density of comminuted regenerated cellulose is substantially greater than wood pulp or cotton linters of the same particle size as shown in the following table wherein all of the materials are of a particle size to pass a 20 mesh screen.

TABLE 1

| Cellulosic material: | Bulk density (lbs./cu. ft.) |
|---|---|
| Scrap cellophane #1 (washed and air dried) | 22.1 |
| Scrap cellophane #2 (washed and air dried) | 25.6 |
| Sulfate wood pulp (air dried) | 5.6 |
| Cotton linters (air dried) | 9.1 |

This high bulk density of the regenerated cellulose coupled with its non-fibrous nature permits a high solids-liquid ratio in the reaction mixture, thus permitting the use of relatively small reaction vessels and, in the case where non-aqueous liquids are employed as diluents, economies in solvent recovery. For example, a regenerated cellulose-liquid ratio of 1 to 9 is free flowing and easily stirred with inexpensive mixers, whereas the ratio of cellulose to liquid when wood pulp or cotton linters is employed must be at least 1 to 19 to yield a stirrable mass. The high bulk density of the regenerated cellulose also results in the sodium carboxymethyl cellulose formed therefrom having a high bulk density, thereby resulting in cost savings in its storage and packaging. The bulk densities of sodium carboxymethyl cellulose passing an 80 mesh screen are shown in the following table.

TABLE 2

| Type of sodium carboxymethyl cellulose: | Bulk density (lbs./cu. ft.) |
|---|---|
| From scrap cellophane | 51.8 |
| From sulfate wood pulp | 34.3 |
| Commercial sodium carboxymethyl cellulose #1 | 32.3 |
| Commercial sodium carboxymethyl cellulose #2 | 41.9 |
| (Purified cellulose gum) | |

In accordance with one form of my invention, comminuted regenerated cellulose in either its wet or dry state is steeped in an aqueous solution of chloroacetic acid and sodium hydroxide until said cellulose has been completely and uniformly impregnated. The concentration of the free sodium hydroxide in the reaction mixture is adjusted, and the reaction is then allowed to proceed at a temperature of from about 30° C. to about 65° C. until the condensation is complete, as evidenced by the disappearance of free caustic in the mixture. Upon the completion of the condensation, the sodium carboxymethyl cellulose is pulverized and dried to about five percent moisture content. If desired, the sodium carboxymethyl cellulose after drying may be washed with alcohol to remove the salt and other impurities for producing a high grade cellulose gum for use as an additive in the food industry.

My invention is characterized by the use of regenerated cellulose as a starting material in the manufacture of sodium carboxymethyl cellulose. Regenerated cellulose as used herein is limited to cellulose which has been previously treated to produce cellulose xanthate and dissolved in dilute caustic to produce viscose rayon and/or cellophane, and thus it is to be understood that regenerated cellulose used herein is to be construed as cellophane or viscose rayon.

In the manufacture of cellophane, the regenerated cellulose is first treated with a softening material, such as glycol, and after such treatment it may normally have a composition consisting of about 75 percent cellulose, 10 percent water, and 15 percent glycol. The cellophane is normally subsequently coated with water-proofing material such as lacquers and plasticizers, and after such treatment, it is rolled and ready for use. In the normal manufacture of such cellophane, scrap is generated both after the cellulose has been treated with glycol and after it has been coated with the water-proofing material. My method of producing sodium carboxymethyl cellulose may employ the waste cellophane which is developed at either of these stages of manufacture.

For ease of description, the process of making sodium carboxymethyl cellulose from regenerated cellulose is described herein with reference to the use of cellophane as a starting material, but it is to be understood that the same method sequence can be employed for the production of sodium carboxymethyl cellulose using viscose rayon as a starting material.

When cellophane which has not been subjected to a water-proofing coating treatment is used as a starting material, or when the cellophane has been coated with a material which is water pervious, it is not necessary to subject said cellophane to extraction procedures. However, when the cellophane has been subjected to a coating treatment with a water-proofing agent, it is necessary that such water-proofing agent be first extracted from the cellophane by the use of a solvent treatment, such as the use of hot acetone. In the examples which are set forth herein, it is assumed that the cellophane does not have present any water-proofing material.

Cellophane scrap, either before or after coating with a water-proofing material, has a thickness of about one thousandth of an inch, and said material is comminuted to pass a 20 mesh screen and to have a bulk density of from 18 lbs. to 26 lbs. per cubic foot. The size of the individual particles may vary as desired, but the larger particles have a lower bulk density and are somewhat less convenient to handle. The thinness of the cellophane, however, still provides the particles with a large surface area irrespective of their lateral dimensions and the mesh of screen through which they will pass.

My method of producing sodium carboxymethyl cellulose may be carried out on either a slurry or mechanical mixing type of operation.

*Example 1*

In carrying out my method in a slurry system, a solution of 77 parts of chloroacetic acid in 100 parts of water is gradually mixed with a solution containing 65 parts of sodium hydroxide in 100 parts of water, while the temperature of the reaction is maintained below 25° C. The resulting solution, including the water formed by the neutralization of the monochloroacetic acid, contains:

|  | Parts |
|---|---|
| Sodium chloroacetate (27.8%) | 95 |
| Free sodium hydroxide (9.4%) | 32 |
| Water (62.8%) | 215 |

One hundred and thirty-three parts of the comminuted cellophane (containing 16% glycol and 9% water) is then steeped in this sodium chloroacetate-caustic solution until it is completely and uniformly impregnated with said solution. The water is then removed as by vacuum evaporation at 15° C.–25° C. until approximately 100 parts of water remain, the resulting reaction mixture having the following analysis:

|  | Parts |
|---|---|
| Sodium chloroacetate (22.8%) | 69.5 |
| Sodium hydroxide (7.7%) | 23.5 |
| Water and glycol (36.8%) | 112 |
| Cellophane (32.7%) | 100 |

After this adjustment of the amount of water in the reaction mixture, the mixture is allowed to react overnight at 35° C.–40° C. The mixture is then neutralized with gaseous carbon dioxide to a pH of 8.0 to 8.5, dried, and pulverized to yield 192 parts of crude sodium carboxymethyl cellulose containing 0.58 carboxymethyl group per glucose unit and analyzing as follows:

|  | Percent |
|---|---|
| Sodium carboxymethyl cellulose | 64.0 |
| Glycol | 5.5 |
| Water | 5.0 |
| Sodium chloride and sodium glycolate | 25.5 |

*Example 2*

An aqueous starting solution of sodium chloroacetate and caustic soda is prepared containing:

|  | Parts |
|---|---|
| Sodium chloroacetate (40.3%) | 649 |
| Sodium hydroxide (8.2%) | 133 |
| Water (51.5%) | 830 |

To this solution is added 563 parts of wet cellophane which has previously been comminuted to pass a 20 mesh screen, washed with water to remove its glycol softener, and squeezed to a 60% moisture content. The mixture is agitated for 10 minutes at 5° C.–10° C., and the excess liquid removed by squeezing with the filtrate and solids showing the following analysis:

|  | Solids | Filtrate |
|---|---|---|
| Sodium Chloroacetate (parts) | 142 (18.8%) | 507 (33.9%) |
| Free Sodium Hydroxide (parts) | 59 (7.8%) | 74 (5.09%) |
| Water (parts) | 329 (43.6%) | 914 (61.1%) |
| Impregnated Cellophane (parts) | 225 (29.8%) | |

The solids are dried in vacuo until approximately 100 parts of water have been removed and the partially dried mixture is allowed to react overnight at 35° C.–40° C. The product of the reaction is neutralized to a pH of 8.0 to 8.5 with gaseous carbon dioxide, dried, and pulverized to yield 435 parts of crude carboxymethyl cellulose containing 0.61 sodium carboxymethyl group per glucose unit and analyzing as follows:

|  | Percent |
|---|---|
| Sodium carboxymethyl cellulose | 72.5 |
| Water | 5.0 |
| Sodium chloride and sodium glycolate | 22.5 |

One half of the filtrate is acidified to a pH below 5 with chloroacetic acid and evaporated in vacuo until approximately 250 parts of water have been removed therefrom. This solution can then be combined with the remainder of the filtrate and additional chloroacetic acid, sodium hydroxide, and water to bring the concentrations of the reactants up to their original values shown at the beginning of this example to thus permit the filtrate to be recycled into different charges of the cellophane.

In the slurry process, the details of which are set forth in Examples 1 and 2 above, the concentrations of the sodium chloroacetate and sodium hydroxide in the starting solutions may vary widely, depending upon the moisture content of the regenerated cellulose, the effectiveness of the squeezing and centrifuging, and the eventual degree of substitution desired. My slurry process operates satisfactorily when the starting solution has a sodium chloroacetate concentration in the range of from about 20 percent to about 43 percent and concentration of the free sodium hydroxide in the range of from about 4 percent to about 10 percent. A one to one molar ratio of sodium chloroacetate to free sodium hydroxide, although necessary for the formation of sodium carboxymethyl cellulose, is not required in the starting solution since the regenerated cellulose preferentially absorbs and reacts with the sodium hydroxide. Before and during the impregnation of the regenerated cellulose with the starting solution, it is desirable to maintain said solution below room temperature, and preferably below 10° C. to avoid the loss of sodium chloroacetate by decomposition.

My invention also contemplates the production of sodium carboxymethyl cellulose from regenerated cellulose in a mixing-type process, wherein said regenerated cellulose is mechanically mixed with sodium hydroxide and an etherifying material, with the latter reactants being either in solution or in a solid state.

Example 3

In carrying out my method in such a mixing process, scrap cellophane having any water-proofing agents removed therefrom is comminuted to pass a 20 mesh screen washed with water, and air dried to a moisture content of 12.7%. A jacketed double-arm mixer is charged with 2200 parts of said cellophane, and a solution containing 977 parts of technical grade sodium hydroxide in 1415 parts of water is sprayed onto the mass of cellophane over a period of about 35 minutes. The mass is mixed for an additional 25 minutes and then, with cooling water circulating through the jacket of the mixer, a solution of 1072 parts of technical chloroacetic acid in 329 parts of water is sprayed onto the mass over a period of 35 minutes. The reaction mixture is subjected to mixing for an additional two hours and the reaction product is then removed from the mixture and allowed to react overnight at a temperature of 35° C. to 40° C. After reacting overnight, the mixture is neutralized to a pH of 8.0 to 8.5 with gaseous carbon dioxide, and then dried to produce a yield of 3787 parts of crude sodium carboxymethyl cellulose having a following analysis:

| | Percent |
|---|---|
| Sodium carboxymethyl cellulose | 68.0 |
| Water | 7.0 |
| Sodium chloride and sodium glycolate | 25.0 |

The sodium carboxymethyl cellulose has a degree of substitution of 0.69, as compared to a theoretical degree of substitution of 0.94, with the reaction thus showing a yield or "efficiency" of 73%.

Example 4

Scrap cellophane having any water-proofing agents removed therefrom is comminuted to pass a 20 mesh screen, and is washed with water and squeezed to a moisture content of 63%. 5,240 grams of the wet cellophane is washed with 13,000 grams of a 34.2% aqueous solution of sodium chloroacetate and then squeezed to remove the excess solution to produce a mixture having the following analysis:

| | | |
|---|---|---|
| Total weight | | 6030 |
| Cellophane (31.7%) | parts | 1915 |
| Sodium chloroacetate (23.4%) | do | 1407 |
| Water (44.9%) | do | 2708 |

This mixture is placed in a jacketed double-arm mixer and 563 grams of solid sodium chloride (technical fine flake) is added thereto over a five minute period, after which the reaction mixture is agitated for three hours. The mixture is then removed from the mixer and allowed to react overnight at 35° C. to 40° C., after which it is neutralized to a pH of 8.0 to 8.5 with gaseous carbon dioxide and dried to yield 4040 parts of crude sodium carboxymethyl cellulose having the following analysis:

| | Percent |
|---|---|
| Sodium carboxymethyl cellulose | 64.3 |
| Water | 7.3 |
| Sodium chloride and sodium glycolate | 28.4 |

The sodium carboxymethyl cellulose has a degree of substitution of 0.65 compared with a theoretical degree of substitution of 1.01 to thus establish a yield or an "efficiency" of 64%.

The sodium carboxymethyl cellulose produced by the reaction set forth in Examples 1–4 dissolves completely in water to form a clear gel-free solution. Also, by using regenerated cellulose, as a starting material, said starting material will have been pretreated in its formation to purify it with the result that the carboxymethyl cellulose formed therefrom is nearly pure white in color and thus forms in water light-colored solutions of substantially constant viscosity.

In both the slurry and mixing processes, the reaction between the alkali cellulose (formed by the sodium hydroxide reacting with the regenerated cellulose) and the sodium chloroacetate proceeds most satisfactorily when the amount of water in the reaction mixture is below 50%, and preferably below 40% in the range of 20% to 40%. This water content in the reaction mixture may be easily attained in the slurry process by evaporation in vacuo or by passing dry air through the reaction mixture while maintaining said reaction mixture at a temperature below 25° C.; and in the mixing process by controlling the amount of water introduced into the mixer.

The reaction time is a function of the temperature at which the reaction is maintained. Normally, the reaction is allowed to proceed at a temperature in the range of from about 30° C. to about 65° C. for a period of from about one hour to about ten hours, a temperature of about 30° C. requiring a reaction time of about ten hours and a temperature of 65° C. requiring a reaction time of about one hour. If temperatures higher than 65° C. are employed, the reaction will be completed within a few minutes, but decomposition of the sodium chloroacetate and degradation of the regenerated cellulose is more likely to occur. Also, the heat of reaction will, of course, be more difficult to dissipate.

Upon completion of the reaction, the number of carboxymethyl groups substituted onto the cellulose molecule will be in the range of from about 0.45 to about 0.85 to 1. This range of substitution is most desirable in commercial practice, since the sodium carboxymethyl cellulose end product becomes less soluble in water with fewer carboxymethyl groups substituted onto the cellulose molecules. If it is desired to purify the sodium carboxymethyl cellulose end product to produce a high purity cellulose gum, the sodium carboxymethyl cellulose may be washed with aqueous alcohol to remove the impurities therefrom.

I claim as my invention:

1. A method of making sodium carboxymethyl cellulose from regenerated cellulose, comprising the steps of:
    (a) mixing comminuted regenerated cellulose having a bulk density of from about 18 lbs./cu. ft. to about 26 lbs./cu. ft. with aqueous solutions of sodium chloracetate and sodium hydroxide to provide a reaction mixture with from about 20% to about 43% sodium chloracetate and from about 4% to about 10% of free sodium hydroxide, said solutions being maintained at a temperature of from 5° C. to 10° C. and said reaction mixture being agitated to completely impregnate said regenerated cellulose with said solutions,
    (b) squeezing said reaction mixture to adjust its water concentration into the range of from about 20% to about 50% and removing a portion of the filtrate formed thereby,
    (c) maintaining said reaction mixture at a temperature of from about 30° C. to about 65° C. for a period of from about 1 hour to about 10 hours until the ratio of carboxymethyl groups substituted onto the glucose molecules is in the range of from 0.45 to 0.85 to 1,
    (d) partially dehydrating said filtrate portion and adding thereto sufficient chloracetic acid to bring its pH below 5,
    (e) combining said filtrate portion with the remainder of said filtrate and adding sufficient chloracetic acid, sodium hydroxide and water thereto to provide an aqueous sodium hydroxide and sodium chloracetate solution for recycling with a new charge of regenerated cellulose and producing a reaction mixture having a sodium chloracetate concentration of from about 20% to about 43% and a sodium hydroxide concentration of from about 4% to about 10%, and
    (f) drying said reaction mixture.

(References on following page)

References Cited

UNITED STATES PATENTS

| | | | |
|---|---|---|---|
| 1,884,629 | 10/1932 | Dreyfuss | 260—231 |
| 2,179,457 | 11/1939 | Voss | 260—231 |
| 2,180,152 | 11/1939 | Kohler | 260—231 |

DONALD E. CZAJA, *Primary Examiner.*

LEON J. BERCOVITZ, A. H. WHITELSTEIN,
*Examiners.*

R. S. AULL, R. W. MULCAHY, *Assistant Examiners.*